June 15, 1937.  W. J. MADDEN  2,084,155
AIR CONDITIONING APPARATUS FOR PASSENGER CARS
Filed March 9, 1936  2 Sheets-Sheet 1
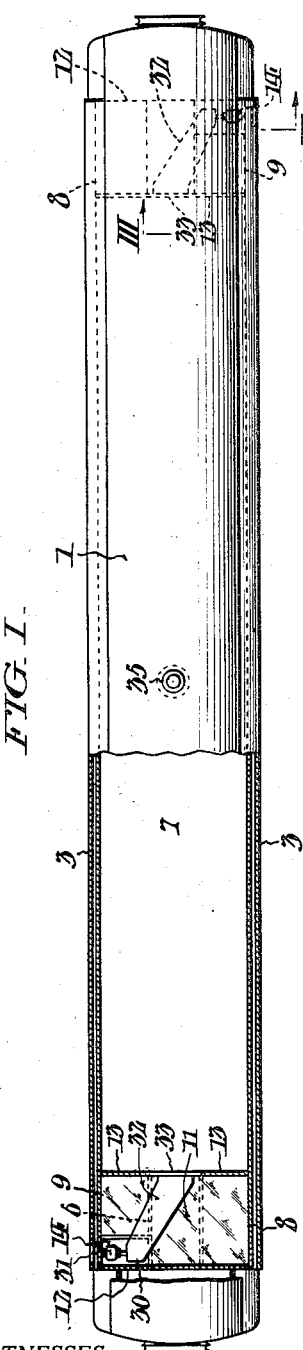
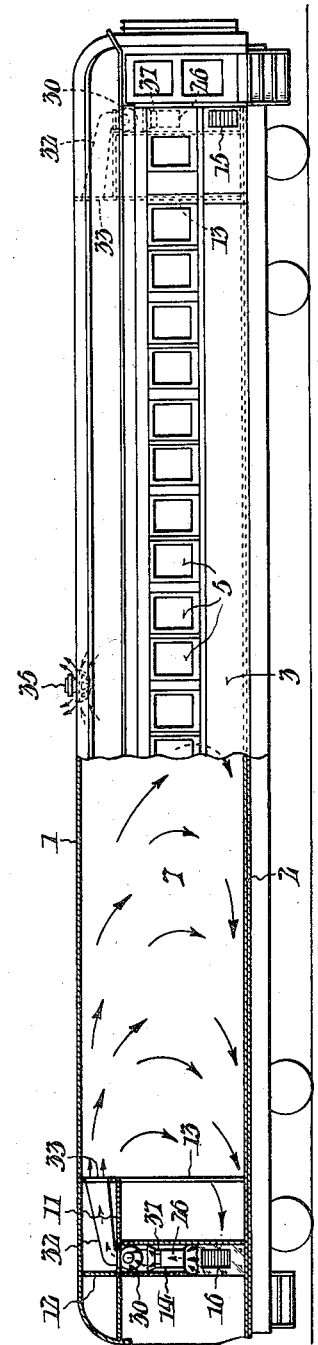
INVENTOR:
William J. Madden,
BY
ATTORNEYS.

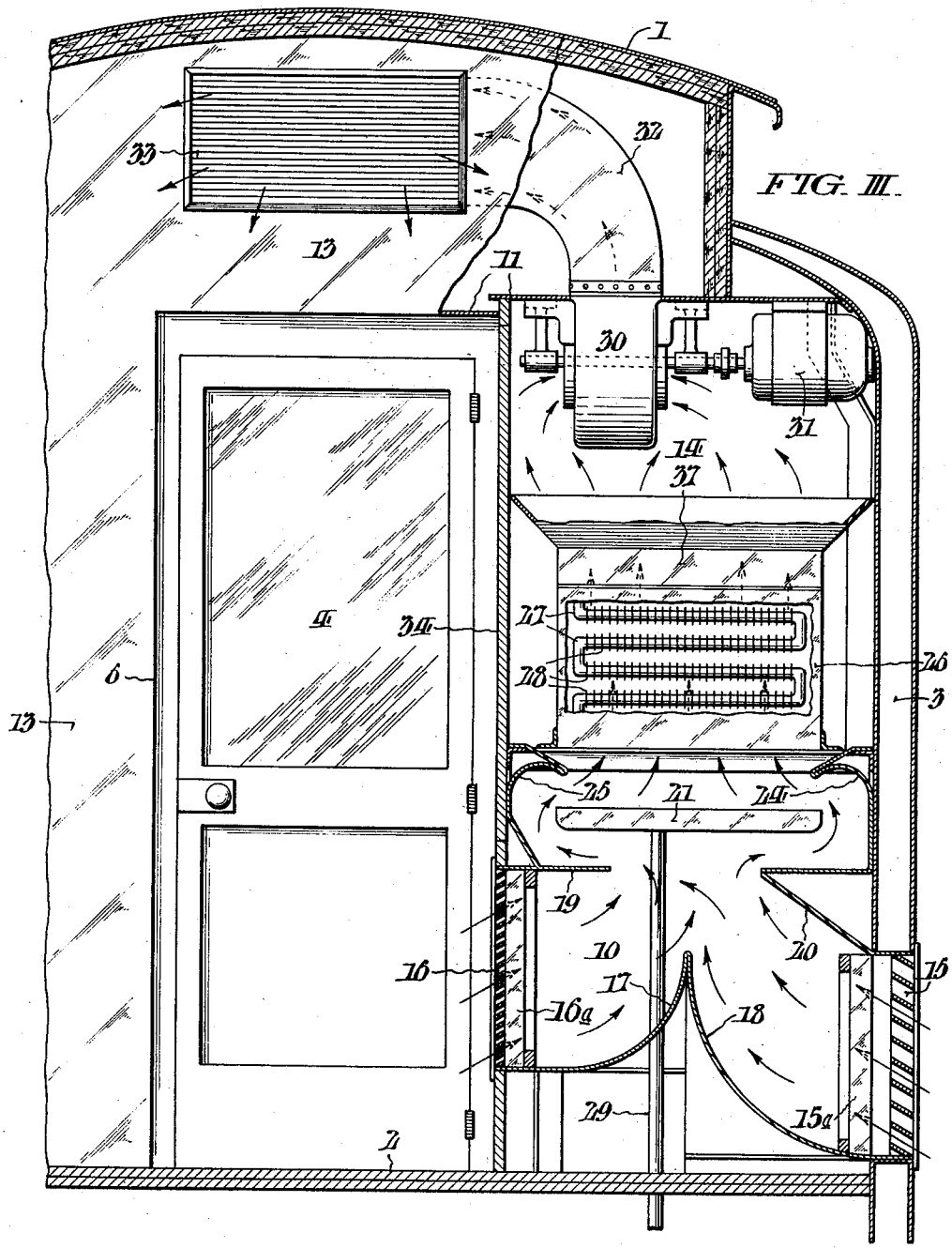

Patented June 15, 1937

2,084,155

UNITED STATES PATENT OFFICE 2,084,155

AIR CONDITIONING APPARATUS FOR PASSENGER CARS

William J. Madden, Lansdowne, Pa., assignor to The Pennsylvania Railroad Company, Philadelphia, Pa., a corporation of Pennsylvania Application March 9, 1936, Serial No. 67,803

3 Claims. (Cl. 62—103)

This invention relates to air conditioning systems, and more particularly to a system adapted for incorporation in a railway passenger car.

Heretofore it has been proposed to utilize space in the upper regions of a passenger car near the roof to accommodate certain of the elements of air conditioning equipment, such as blowers, filters, and surface cooling means, and to locate the remaining elements of the system beneath the car. One objection to such an arrangement is that it requires a number of relatively long pipe lines to conduct the refrigerant from the refrigerating apparatus beneath the car to the cooling means at the roof thereof through which the air is circulated, and unless such pipe lines are well insulated, there is an obvious sacrifice in efficiency. Another objection to such an arrangement is that it renders a large part of the air conditioning equipment inaccessible for maintenance and inspection.

One object of the present invention is to provide an improved arrangement of the elements of the air conditioning equipment with relation to the car structure which avoids the above recited disadvantages.

Another object of the invention is to provide an air conditioning system which requires a minimum of alteration or re-arrangement of the car, and one which is compact, readily accessible and of simple and inexpensive construction.

Another object of the invention is to provide a system in which quantities of fresh air from outside the car are admitted and mixed with quantities of air withdrawn from the passenger space prior to conditioning, and in which improved means are provided for mixing together such fresh air and withdrawn air.

Other objects and advantages characteristic of my invention will become more fully apparent from the description hereinafter set forth of one example or embodiment of the invention as applied to a conventional railway passenger car, having reference to the accompanying drawings. Of the drawings:

Fig. I represents a plan view of a railway passenger car embodying my invention, with a portion of the car roof broken away to reveal the interior.

Fig. II represents a side elevation of the same, with a portion of the side wall broken away to reveal the interior; and, Fig. III represents an enlarged cross section, taken as indicated by the lines III—III of Fig. I.

In the drawings there is shown a conventional railway passenger car of the day-coach type, and although the invention is thus illustrated as applied to a particular type of car, it will be understood that the invention is equally applicable to many other forms of passenger carrying cars. The car body comprises, generally, a roof 1, a floor 2, and side walls 3. The car includes the usual end doors 4 and windows 5, preferably having double sashes, the windows being kept closed in order to establish a substantially closed system with controlled admission of quantities of fresh air.

In the illustrated example, the two ends of the car are formed in like manner, each end being provided with air conditioning equipment. Accordingly, a description of the structure and apparatus applied at one end of the car will suffice to give a complete understanding of the improvements of this invention. At the end of the car a central passageway 6 leads from the end door 4 to the passenger space 7. In the customary manner, rooms 8, 9 are provided at each side of the central passageway 6, and it may be assumed, by way of example, that the room 8 constitutes a toilet and the room 9 a lavatory, though obviously these rooms may be used for any desired purpose. Above this region of the car there is formed a monitor deck having a horizontal ceiling plate 11 and transverse bulk heads 12, 13, which define with the roof 1 of the car a substantially closed overhead compartment.

Between the central passageway 6 and one side wall 3 of the car, there is formed a compartment 14 which is relatively narrow in the direction of the longitudinal axis of the car, but which extends transversely for the full space between the passageway 6 and the car side 3. The compartment 14 forms a vertical duct, and has near the base thereof, as clearly shown in Fig. III, an intake 15 situated at the side wall of the car and adapted to admit fresh air from the exterior, and an intake 16 situated at the central passageway and adapted to receive air withdrawn from the passenger space 7. Associated with each intake 15, 16, there is a filter 15a, 16a which serves to clean air passing therethrough.

At the base of the compartment 14, there is a mixing chamber 10 having guiding surfaces 17, 18 which deflect the incoming air upwardly and toward the center of the compartment 14 in the manner clearly illustrated in Fig. III. These surfaces 17, 18 also serve to prevent cross flow of air from the fresh air intake 15 across the mixing chamber 10 and through the opposite intake 16 when strong lateral wind currents are encountered. Additional surfaces 19, 20 serve as baffles and obstruct direct upward flow of currents of air along the sides of the compartment. A horizontally disposed tray 21 is located centrally within the compartment 14 and serves also as a deflecting baffle. The tray 21 and oppositely disposed baffles 19, 20, form restricted passageways for the upflowing air. At each side of the tray 21, additional air guiding surfaces 24, 25 are formed, and these surfaces direct the upwardly flowing air currents around the tray toward the central axis of the compartment. The various baffles and air guiding surfaces thus described are so formed and arranged that the incoming fresh air passing through the intake 15 is directed across the path of the incoming air withdrawn from the passenger space through the intake 16. Moreover, the formation of the baffles and guiding surfaces is such that, in order to pass beyond the tray 21, the air currents are caused to swirl with centrifugal motion and to change their course of direction. Sufficient turbulence is thus created in the mixing chamber 10 that the fresh air is thoroughly mixed with the air withdrawn from the car prior to admission to the cooling means 26.

The cooling means 26 may comprise any convenient form of heat interchange apparatus. As shown in the drawings, the cooling means 26 takes the form of a continuous pipe 27 having a series of U-bends and having projecting fins 28 through which heat is readily absorbed from the air. The refrigerant flowing through the surface cooler 26 may be of any desirable character such for example as ice water. Apparatus for refrigerating the medium flowing through the surface cooler 26 is conveniently located beneath the floor 2, and such apparatus, being well known in the art, is not illustrated herein. Moisture deposited on the surface cooler 26 falls by gravity to the tray 21 where it is collected and from which it is discharged through a drain pipe 29.

Air discharged from the surface cooler 26 is drawn into a blower 30 driven by an electric motor 31. At the discharge side of the blower 30, there is provided a duct 32 which leads from the upper region of the compartment 14 through the monitor deck, diagonally to the transverse bulkhead 13 where it terminates in an outlet grille 33, preferably disposed above the central passageway 6. All of the conditioned air is forced by the blower 30 through the duct 32 and discharged into the passenger space 7 of the car at the outlet grille 33. The distribution of air thus discharged within the passenger space 7 is represented by the arrows in Fig. II.

In the wall of the compartment 14 adjacent to the central passageway 6, there is a panel or door 34 which may be opened or removed to give access to the apparatus within the compartment. At the center of the car roof, there is desirably provided a continuously operated exhaust fan 35 which assists in promoting circulation of the air within the passenger space 7 from each end along the roof toward the center of the car.

In order that the system herein described may be used in the winter season for the purpose of heating the air, as well as in the summer season for the purpose of cooling the air, there is provided within the air conditioning compartment 14 a heating unit 37 which is desirably located immediately above the cooling means 26 and which may take the form of an ordinary radiator.

The operation of the apparatus of this invention, in the summer season, is as follows. The motor driven blower 30 is continuously operated and serves to draw quantities of fresh air from the exterior of the car through the intake 15, as well as quantities of air from the passenger space 7 through the central passageway 6 and the intake 16. Currents of fresh and recirculated air are thoroughly mixed together in the mixing chamber 10, the various baffles and guiding surfaces creating a sufficient turbulence of the air in its passage around the tray 21 so that before admission to the surface cooler 26 substantial heat exchange has been effected, the outside air being thus precooled prior to contact with the fins 28 of the surface cooler. The combined fresh and recirculated air, after passage through the surface cooler 26, is drawn into the blower 30 and carried through the duct 32 to the grille 33, from whence it is discharged into the passenger space near the roof of the car. Simultaneously, the exhaust fan 35 removes from the upper region of the car quantities of vitiated air at the region of the car where such air is most likely to be concentrated. In the winter season the operation of the system is substantially the same except that the heating unit 37 is used instead of the cooling unit 26.

It will be particularly observed that all of the air conditioning apparatus, except those parts which are located at the underside of the car, is housed within a relatively small compartment taking up a minimum of revenue space in the car, and that said compartment is readily accessible. The electrical controls for the unit may be located within or near the air conditioning compartment, making the entire apparatus very compact and easy to inspect or repair. The efficiency of the apparatus is increased by reason of the special character of the mixing chamber within which the air is precooled prior to delivery to the surface cooler.

While I have described one example of the practice of this invention, as applied to a particular type of railway car, it will be apparent that the apparatus may be applied to various types of passenger cars, and that various changes may be made in the form of the apparatus disclosed, without departing from the spirit of the invention as defined in the annexed claims.

Having thus described my invention, I claim:

1. In a railway passenger car, a compartment for air conditioning equipment, said compartment having a mixing chamber at the base thereof near the floor level of the car with an intake for fresh air from the exterior of the car and an intake for recirculated air from the passenger space, cooling means disposed above said mixing chamber, means for drawing air through said intakes and said cooling means and then discharging it into the passenger space, and baffling means projecting within said mixing chamber and associated with each said intake, said baffling means being so disposed as to obstruct cross flow of air from said fresh air intake to said recirculated air intake and so directed as to cause the currents of fresh and recirculated air to cross each other in their passage upwardly through the mixing chamber, whereby said currents of air are mixed and retarded prior to admission to said cooling means.

2. In a railway passenger car, a compartment for air conditioning equipment, said compartment having a mixing chamber at the base thereof near the floor level of the car with an intake for fresh air from the exterior of the car and an intake for recirculated air from the passenger space, cooling means disposed above said mixing chamber, means for drawing air through said intakes and said cooling means and then discharging it into the passenger space, and baffling means including deflecting surfaces associated with each said intake for obstructing cross flow of air from said fresh air intake to said recirculated air intake and for guiding and directing the currents of fresh and recirculated air whereby they cross each other in their passage upwardly through the mixing chamber, and a solid protective baffle forming the top of said mixing chamber and causing the air currents to diverge in their passage around said baffle and then to converge prior to admission to said cooling means.

3. In a railway passenger car, a compartment for air conditioning equipment, said compartment having a mixing chamber at the base thereof near the floor level of the car with an intake for fresh air from the exterior of the car and an intake for recirculated air from the passenger space, cooling means disposed above said mixing chamber, means for drawing air through said intakes and said cooling means and then discharging it into the passenger space, and baffling means including deflecting surfaces associated with each said intake for obstructing cross flow of air from said fresh air intake to said recirculated air intake and for guiding and directing the currents of fresh and recirculated air whereby they cross each other in their passage upwardly through the mixing chamber, and a solid protective baffle forming the top of said mixing chamber and causing the air currents to diverge in their passage around said baffle and then to converge prior to admission to said cooling means, said solid protective baffle being in the form of a tray and serving to collect moisture deposited by said cooling means.

WILLIAM J. MADDEN.